US009923409B2

(12) United States Patent
Tschirhart

(10) Patent No.: US 9,923,409 B2
(45) Date of Patent: Mar. 20, 2018

(54) RECTIFICATION AND REGULATION CIRCUIT FOR A WIRELESS POWER RECEIVER

(71) Applicant: Infineon Technologies Austria AG, Villach (AT)

(72) Inventor: Darryl Tschirhart, Torrance, CA (US)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 15/455,231

(22) Filed: Mar. 10, 2017

(65) Prior Publication Data

US 2017/0187230 A1    Jun. 29, 2017

Related U.S. Application Data

(63) Continuation of application No. 14/292,148, filed on May 30, 2014, now Pat. No. 9,634,514.

(51) Int. Cl.
*H02J 7/00* (2006.01)
*H02J 7/02* (2016.01)
(Continued)

(52) U.S. Cl.
CPC .............. *H02J 7/025* (2013.01); *H02J 50/12* (2016.02); *H02J 7/04* (2013.01)

(58) Field of Classification Search
USPC ....................................................... 320/108
See application file for complete search history.

(56) References Cited

U.S. PATENT DOCUMENTS 8,724,348 B2    5/2014  Sase et al.
2004/0052100 A1   3/2004  Huang et al.
(Continued)

FOREIGN PATENT DOCUMENTS

CN    101911029 A    12/2010
CN    102144239 A    8/2011
(Continued)

OTHER PUBLICATIONS

Conesa, et al., "The Serial Resonant Converter with Controlled Rectifier Stage", IEEE European Conference on Power Electronics and Application, Sep. 2005, pp. 1-10.
(Continued)

*Primary Examiner* — Mohammed Alam
(74) *Attorney, Agent, or Firm* — Murphy, Bilak & Homiller, PLLC

(57) ABSTRACT

A rectification and regulation circuit for a wireless power receiver includes a coil for magnetically coupling to a primary coil of a power transmitter, a full-wave rectifier circuit separate from the power transmitter and a control unit separate from the power transmitter. The full-wave rectifier has a first pair of controllable rectifiers including a first transistor connected to a first terminal of the coil and a second transistor connected to a second terminal of the coil. The control unit is operable to control switching of the transistors of the full-wave rectifier so that the full-wave rectifier (a) generates a rectified output for charging a battery of the wireless power receiver by rectifying current through the coil or voltage across the coil, and (b) regulates the rectified output.

11 Claims, 13 Drawing Sheets

(51) Int. Cl.
*H02J 50/12* (2016.01)
*H02J 7/04* (2006.01)

(56) References Cited

U.S. PATENT DOCUMENTS

| | | | | |
|---|---|---|---|---|
| 2009/0038623 | A1* | 2/2009 | Farbarik | A61F 2/02 128/848 |
| 2013/0058379 | A1 | 3/2013 | Kim et al. | |
| 2013/0207601 | A1* | 8/2013 | Wu | H02M 3/33576 320/108 |
| 2014/0159646 | A1* | 6/2014 | Sankar | H02J 17/00 320/107 |
| 2014/0334189 | A1 | 11/2014 | Yan et al. | |
| 2014/0347008 | A1* | 11/2014 | Chae | H02J 5/005 320/108 |
| 2015/0042274 | A1* | 2/2015 | Kim | H02J 7/06 320/108 |
| 2015/0098162 | A1* | 4/2015 | Kohout | H02H 9/041 361/91.5 |
| 2015/0207336 | A1* | 7/2015 | Morreale | H02J 5/005 307/104 |

FOREIGN PATENT DOCUMENTS

| | | |
|---|---|---|
| CN | 103580300 A | 2/2014 |
| CN | 103683530 A | 3/2014 |
| JP | 4568783 B2 | 10/2010 |
| JP | 2013524743 A | 6/2013 |
| JP | 2014087134 A | 5/2014 |

OTHER PUBLICATIONS

Kazimierczuk, et al., "Class D Converter with Half-Wave Regulated Synchronous Rectifier", Applied Power Electronics Conference and Exposition, Ninth Annual IEEE Conference and Proceedings 1994, pp. 1005-1011.

Kazimierczuk, et al., "Class D Current-Driven Transformer Center-Tapped Controllable Synchronous Rectifier", IEEE Transactions on Circuit and Systems: Fundamental Theory and Applications, vol. 43, No. 8, Aug. 1996, pp. 670-680.

Pan, et al., "Secondary-Side Adaptive Digital Controlled Series Resonant DC-DC Converters for Low Voltage High Current Applications", IEEE Power Electronics Specialists Conference, Jun. 2008, pp. 711-717.

Rosetto, et al., "Series Resonant Converter with Wide Load Range", IEEE Industry Applications Conference, Thirty-Third IAS Annual Meeting, Oct. 1998, pp. 1326-1331.

Tschirhart, et al., "A Constant Frequency Series-Parallel Resonant Converter with Dual-Edge PWM to Implement Secondary-Side Control", IEEE Energy Conversion Congress and Exposition, Sep. 2009, pp. 825-832.

Tschirhart, et al., "Secondary-side Control of a Constant Frequency Series Resonant Converter Using Dual-Edge PWM", Twenty-Fifth Annual IEEE Applied Power Electronics Conference and Exposition, Feb. 2010, pp. 544-550.

Unknown, Author, "bq 51221 Dual Mode 5-W (WPC and PMA) Single Chip Wireless Power Receiver", Texas Instruments Incorporated, www.ti.com, Dallas, Texas, Feb. 2014, pp. 1-47.

Unknown, Author, "Industry's First Multi-Mode WPC Compliant Wireless Power Receiver IC", Integrated Device Technology, Inc., IDTP9030, 2013, pp. 1-30.

Unknown, Author, "ORIGA SLE95200 Original Product Authentication and Brand Protection Solution Short Product Information", Infineon Technologies, 81726, Munich, Germany, Feb. 2012, pp. 1-15.

Youssef, et al., "An Advanced Design Solution for the 48V Isolated Voltage Regulator Modules", IEEE International Symposium on Industrial Electronics, Jul. 9-13, 2006, pp. 1036-1041.

Youssef, et al., "Performance and Design of a Novel Constant Frequency 48V Voltage Regulator Module", The 30th Annual Conference of the IEEE Industrial Electronics Society, Nov. 2-6, 2004, pp. 313-318.

* cited by examiner

RECTIFICATION AND REGULATION CIRCUIT FOR A WIRELESS POWER RECEIVER

TECHNICAL FIELD

The present application relates to wireless charging systems, in particular rectification and regulation operations for wireless charging systems.

BACKGROUND

In wireless charging systems, multiple power conversion stages process the energy being transmitted from the source to battery (load). System efficiency is defined as the ratio of output power (at the load) to input power (from the source), and is the product of efficiencies of each power conversion stage. Therefore, to maintain high system efficiency, it is beneficial to reduce the number of power conversion stages. It is typically assumed that a DC source provides the input to the system. In reality, the DC source is itself a by-product of multiple conversion stages from the ac mains, further exacerbating the problem.

The power transmitter consists of a chopper circuit that is either a full-bridge or half-bridge configuration, a resonant network composed of some configuration of inductors and capacitors, and a primary coil. The power receiver has a secondary coil, a rectification stage formed of synchronous rectifiers or simple diodes if efficiency is not a concern, and a buck converter (using external filter components) to provide regulation to the battery being charged. Physical separation between the primary and secondary coils changes the characteristics of the resonant network, and therefore power transfer capability.

Many commercial products use the rectifier stage of the receiver in open-loop, followed by a buck converter stage for providing regulation to the load. Switches of the rectifier stage are typically synchronized to the resonant waveform being rectified to improve efficiency over diode rectifiers. A buck converter made up of switches provides regulation to the load. If input power needs to be adjusted, the receiver communicates with the transmitter. However, this approach requires the power receiver to have two stages for regulating the voltage or current of the battery being charged, making it difficult to achieve very high efficiency. Also, the non-isolated DC/DC regulator typically is a buck converter for simplicity which is a hard-switched topology. Therefore, attempts to increase the switching frequency to shrink the inductor and overcome the limitations of magnetic component technology leads to lower efficiency.

SUMMARY

According to an embodiment of a rectification and regulation circuit for a wireless power receiver, the circuit comprises a coil, a full-wave rectifier and a control unit. The full-wave rectifier has a first pair of controllable rectifiers comprising a first transistor connected to a first terminal of the coil and a second transistor connected to a second terminal of the coil. The control unit is operable to control switching of the transistors of the full-wave rectifier so that the full-wave rectifier (a) generates a rectified output for charging a battery of the wireless power receiver by rectifying current through the coil or voltage across the coil and (b) regulates the rectified output.

According to an embodiment of a method of rectification and regulation for a wireless power receiver using a circuit including a full-wave rectifier having a first pair of controllable rectifiers comprising a first transistor connected to a first terminal of a coil and a second transistor connected to a second terminal of the coil, the method comprises: switching the transistors of the full-wave rectifier so that the full-wave rectifier generates a rectified output for charging a battery of the wireless power receiver by rectifying current through the coil or voltage across the coil; and switching the transistors of the full-wave rectifier to regulate the rectified output.

According to an embodiment of a wireless power receiver, the receiver comprises a battery, a filter connected to the battery, a coil for charging the battery, a full-wave rectifier connecting the coil to the filter, and a control unit. The full-wave rectifier has a first pair of controllable rectifiers comprising a first transistor connected to a first terminal of the coil and a second transistor connected to a second terminal of the coil. The control unit is operable to control switching of the transistors of the full-wave rectifier so that the full-wave rectifier (a) generates a rectified output for charging the battery by rectifying current through the coil or voltage across the coil and (b) regulates the rectified output.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein use secondary-side control in wireless charging systems that allows for a wide range of controllability. The power receiver of the wireless charging system includes a secondary coil, a full-wave rectifier and a control unit. The full-wave rectifier has a first pair of controllable rectifiers comprising a first transistor connected to a first terminal of the coil and a second transistor connected to a second terminal of the coil. The full-wave rectifier can have only the first pair of controllable rectifiers or also a second pair of controllable rectifiers, depending on whether a center tap configuration is used as explained in greater detail later herein. In either case, the control unit is operable to control switching of the transistors of the full-wave rectifier so that the full-wave rectifier (a) generates a rectified output for charging a battery of the wireless power receiver by rectifying current through the coil or voltage across the coil and (b) regulates the rectified output. As such, an additional regulation stage such as a non-isolated dc/dc converter is not necessary as the transistors of the full-wave rectifier are controlled to provide both rectification and regulation to the battery (load). Thus, only one conversion stage is used in the power receiver, thereby promoting high efficiency and reducing size and cost.

Figure 1:
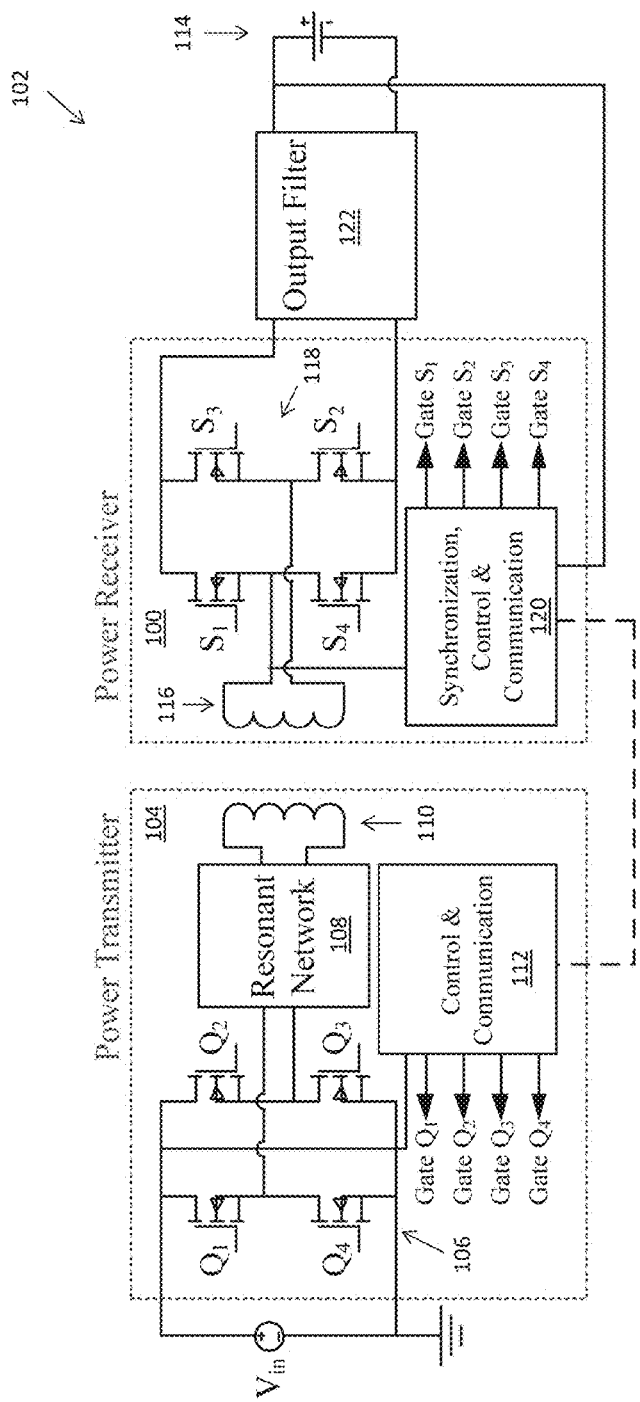
FIG. 1 illustrates a block diagram of an embodiment of a wireless charging system including a power receiver with a single rectification and regulation stage.

FIG. 1 illustrates one embodiment of the power receiver 100 and corresponding wireless charging system 102. The power transmitter 104 of the wireless charging system 102 includes a chopper circuit 106 that is either a full-bridge or half-bridge configuration, a resonant network 108 having some configuration of inductors and capacitors, a primary coil 110, and a control unit 112 for controlling operation of the chopper circuit 106 and communicating with the power receiver 100. For example, the transmitter control unit 112 adjusts the frequency or other control variable of transistors $Q_1$ through $Q_4$ of the chopper circuit 106. The transmitter control unit 112 can also enable communication with the power receiver 100 as indicated by the dashed line in FIG. 1, although communication is not necessary for a majority of the operating points as long as the power transmitter 104 maintains a constant fundamental component against variations of the input voltage Vin.

The power transmitter 104 wirelessly transfers power to the power receiver 100 via the primary coil 110 for charging a battery 114 of the wireless power receiver 100. For example, the power transmitter 104 can be a pad on which the power receiver 100 is placed for charging. The chopper circuit 106 has a full-bridge configuration in FIG. 1, comprising transistors $Q_1$, $Q_2$, $Q_3$, and $Q_4$. The transmitter control unit 112 generates gate signals ("Gate $Q_1$", "Gate $Q_2$", etc.) for switching the transistors of the chopper circuit 106. The DC input (Vin) to the power transmitter 104 is illustrated as a DC source, which is typically derived by multiple conversion stages from the ac mains.

The power receiver 100 of the wireless charging system 102 includes a secondary coil 116, a full-wave rectifier 118 and a control unit 120. According to this embodiment, the full-wave rectifier 118 has two pairs of controllable rectifiers. The first pair of controllable rectifiers comprises a first transistor ($S_1$) connected to a first terminal of the secondary coil 116 and a second transistor ($S_2$) connected to a second terminal of the coil 116. The second pair of controllable rectifiers comprises a third transistor ($S_3$) connected to the second terminal of the secondary coil 116 and a fourth transistor ($S_4$) connected to the first terminal of the coil 116. The transistors of the full-wave rectifier 118 are operated as controlled rectifiers and therefore can be any standard transistor type suitable for use as a synchronous rectifier such as FETs (field effect transistors), IGBTs (insulated gate bipolar transistors), etc., where the switching state of the transistors determines whether the transistors are configured as diodes or for rectifying low ac current with a small voltage drop. The receiver control unit 120 generates respective gate signals ("Gate $S_1$", "Gate $S_2$", etc.) to control switching of the rectifier transistors so that the full-wave rectifier 118 (a) generates a rectified output for charging the battery 114 of the wireless power receiver 100 by rectifying current through the secondary coil 116 or voltage across the coil 116 and (b) regulates the rectified output.

According to the embodiment of FIG. 1, the receiver control unit 120 uses alternate edge-modulation for switching the transistors of the full-wave rectifier 118 to increase the range of controllability. The alternate edge-modulation technique can be applied to voltage-type or current-type resonant topologies. The designation of voltage-type or current-type identifies the sinusoidal waveform responsible for transferring power.

Figure 2:
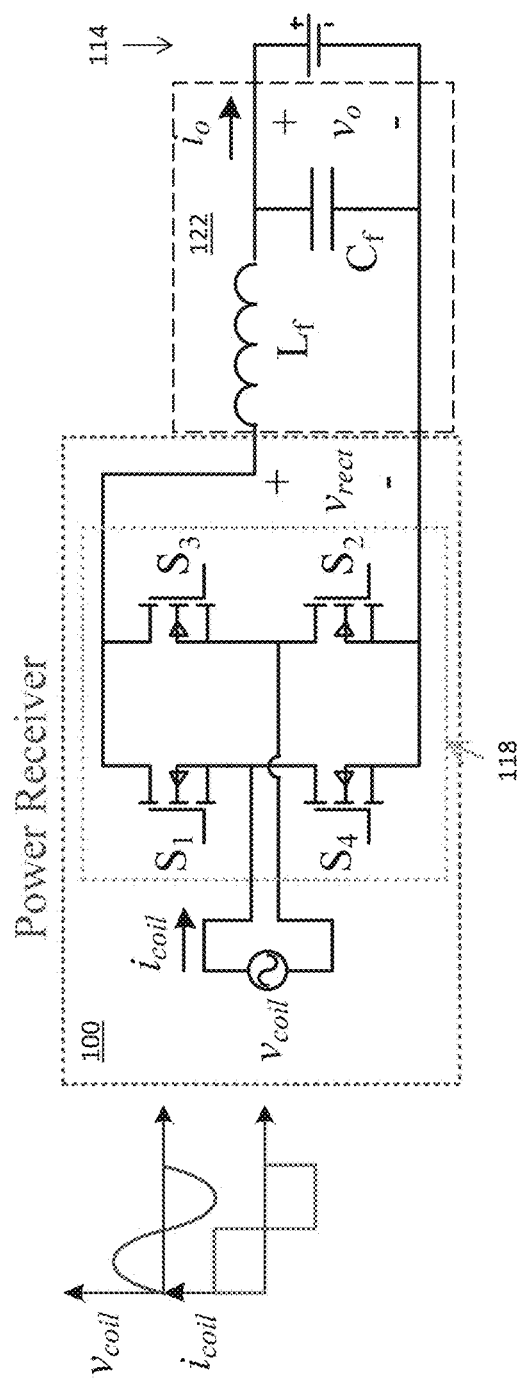
FIG. 2 illustrates a block diagram of an embodiment of the power receiver of FIG. 1 implemented as a voltage-type resonant converter.

FIG. 2 shows the power receiver 100 and external filter 122 of the wireless charging system 102 of FIG. 1 implemented as a voltage-type resonant converter, where $V_{coil}$ is the time-varying voltage across the terminals of the secondary coil 116 and $i_{coil}$ is the corresponding current in the coil 116. The external filter 122 is shown as a low-pass filter comprising an inductor ($L_f$) and capacitor ($C_f$) for charging the battery 114 of the power receiver 100. Operation of the power receiver 100 shown in FIG. 2 is explained next in further detail with reference to FIG. 3.

Figure 3:
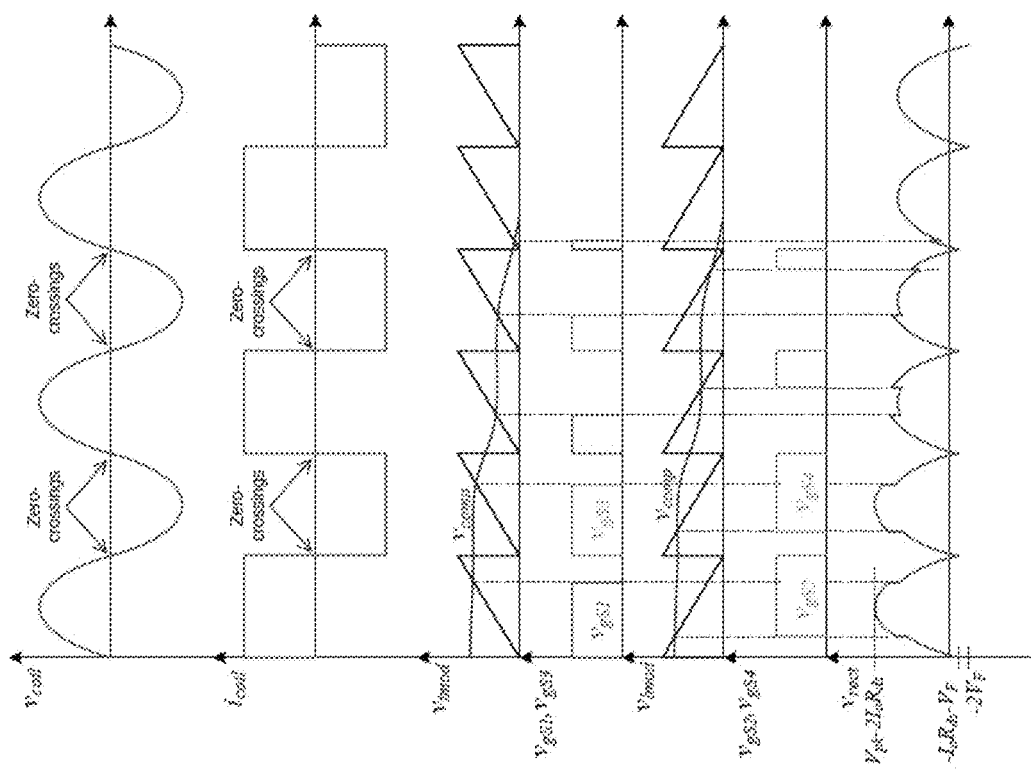
FIG. 3 illustrates various waveforms associated with operating the power receiver of FIG. 2 using alternate-edge modulation to achieve rectification and regulation.

FIG. 3 illustrate various waveforms associated with the operation of the voltage-type resonant power converter 100 of FIG. 2, where $V_{comp}$ is a compensated error signal present in any linear control network. The receiver control unit 120 uses trailing-edge modulation for switching transistors $S_1$ and $S_3$ of the full-wave rectifier 118 and leading-edge modulation for switching transistors $S_2$ and $S_4$ of the rectifier 118. In one embodiment, the receiver control unit 120 switches the first and third rectifier transistors $S_1$, $S_3$ based on a trailing-edge PWM (pulse width modulation) signal ($V_{tmod}$) which is synced to the resonant current or voltage waveform ($i_{coil}$ or $V_{coil}$) for the secondary coil 110. The receiver control unit 120 also switches the second and fourth rectifier transistors S2, S4 based on a leading-edge PWM signal ($V_{lmod}$) which is also synced to the resonant waveform. The trailing-edge and leading-edge PWM signals $V_{tmod}$, $V_{lmod}$ each go to (i.e. approach) zero at zero-crossing points of the resonant waveform.

The receiver control unit 120 turns off the first rectifier transistor $S_1$ if the first transistor $S_1$ is on or turns off the third rectifier transistor $S_3$ if the third transistor $S_3$ is on, responsive to the trailing-edge PWM signal $V_{tmod}$ rising above the compensated error signal $V_{comp}$. The receiver control unit 120 similarly turns on the second rectifier transistor $S_2$ if the second transistor $S_2$ is off or turns on the fourth rectifier transistor $S_4$ if the fourth transistor $S_4$ is off, responsive to the leading-edge PWM signal $V_{lmod}$ falling below the error signal $V_{comp}$. The gate voltages of the rectifier transistors are labelled $V_{gS1}$, $V_{gS2}$, $V_{gS3}$, and $V_{gS4}$, in FIG. 4, respectively, the levels of which correspond to the respective gate signals ("Gate $S_1$,", "Gate $S_2$", etc.) generated by the receiver control unit 120 as shown in FIG. 1. The rectification and regulation behaviour of the full-wave rectifier 118 is identical if the modulation scheme is switched i.e. leading-edge modulation is used for rectifier transistors $S_1$ and $S_3$ and trailing-edge modulation is used for rectifier transistors $S_2$ and $S_4$.

In either case, when the transistors of the full-wave rectifier 118 are operated in an open-loop manner, the rectified voltage ($V_{rect}$) corresponds to the rectified coil voltage reduced by two resistive drops (2IoRds) of the transistors i.e. Vrect=|$V_{coil}$|−2IoRds where Io is the transistor output current (e.g. drain current of an FET) and Rds is the transistor on-state resistance (e.g. the drain-to-source resistance of an FET). Under alternating edge modulation, there are three possible rectifier voltage drops: (1) 2IoRds; (2) $V_F$+IoRds; or (3) 2$V_F$ where $V_F$ is the forward voltage of the transistor body diodes. The body diodes do not conduct at full-load. As the load reduces, the body diodes are allowed to conduct a greater portion of the cycle, thus enabling the full-wave rectifier 118 to perform both rectification and regulation in a single voltage-type resonant power receiver stage.

In more detail, the output voltage of the voltage-type resonant converter 100 shown in FIG. 2 is calculated as given by:

$$V_o = \frac{1}{T_{sw}} \int_0^{T_{sw}} v_{rect}(t)dt \quad (1)$$

Using the ratios $$\gamma = \frac{V_F}{V_o} \text{ and } \lambda = \frac{R_{ds}}{R_L},$$

the steady-state fundamental ac voltage across the primary coil 110 is given by:

$$V_{ac,rms} = \frac{\pi N V_o}{2\sqrt{2}} \beta \quad (2)$$

where $D_{SR}$ is the duty cycle of the transistors operating as synchronous rectifiers and is equal to the ratio of $V_{comp}$ to the magnitude of the modulators ($V_{tmod}$=$V_{lmod}$). N is the turns ratio of the primary coil 110 to secondary coil 116. The conversion factor $\beta$ is given by:

$$\beta = 1 + \gamma(1-D_{SR}) + \lambda D_{SR}$$

From equations (1)-(3), adjusting the conduction of the rectifier transistors changes the voltage at the primary coil 110 which implies changing the transfer characteristics of the resonant tank. Thus load regulation is achieved by the alternate edge-modulation of the full-wave rectifier transistors at the power receiver 100.

Figure 4:
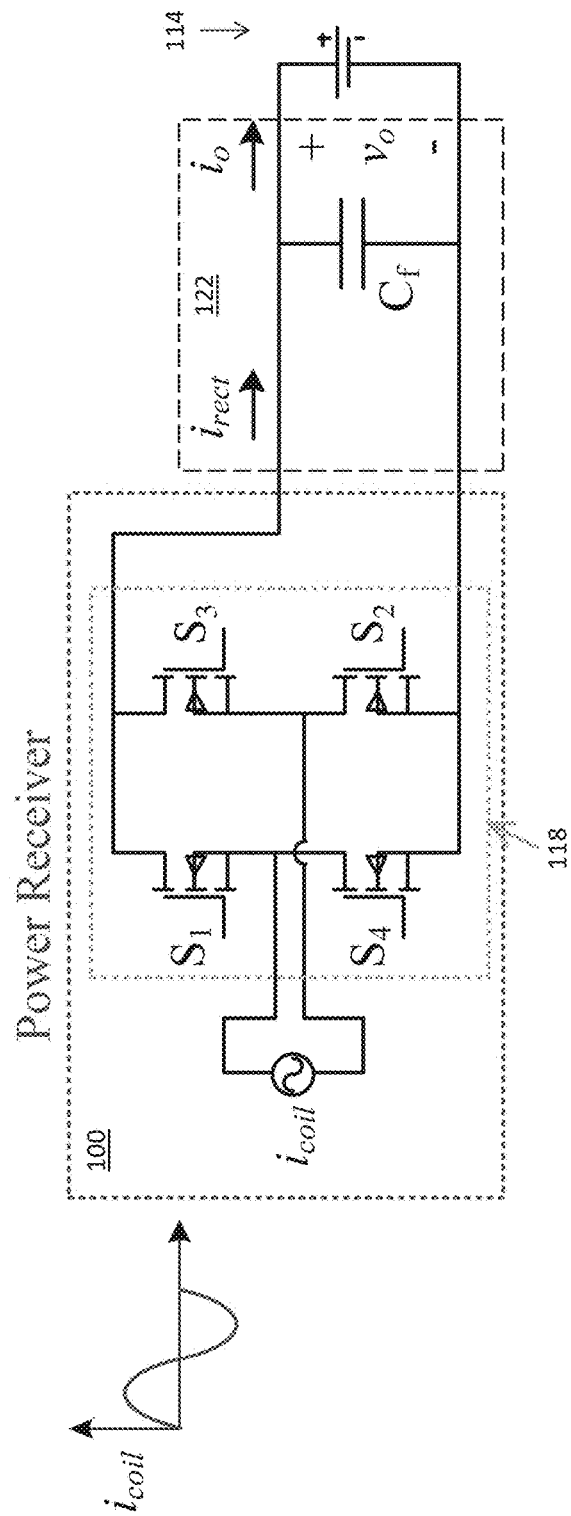
FIG. 4 illustrates a block diagram of an embodiment of the power receiver of FIG. 1 implemented as a current-type resonant converter.

FIG. 4 shows the power receiver 100 and external filter 122 of the wireless charging system 102 of FIG. 1 implemented as a current-type resonant network, where $i_{coil}$ is the time-varying current in the secondary coil 116. The external filter 122 is implemented as a capacitor ($C_f$) for charging the battery 114 of the power receiver 100. Operation of the power receiver 100 shown in FIG. 4 is explained next in further detail with reference to FIG. 5.

Figure 5:
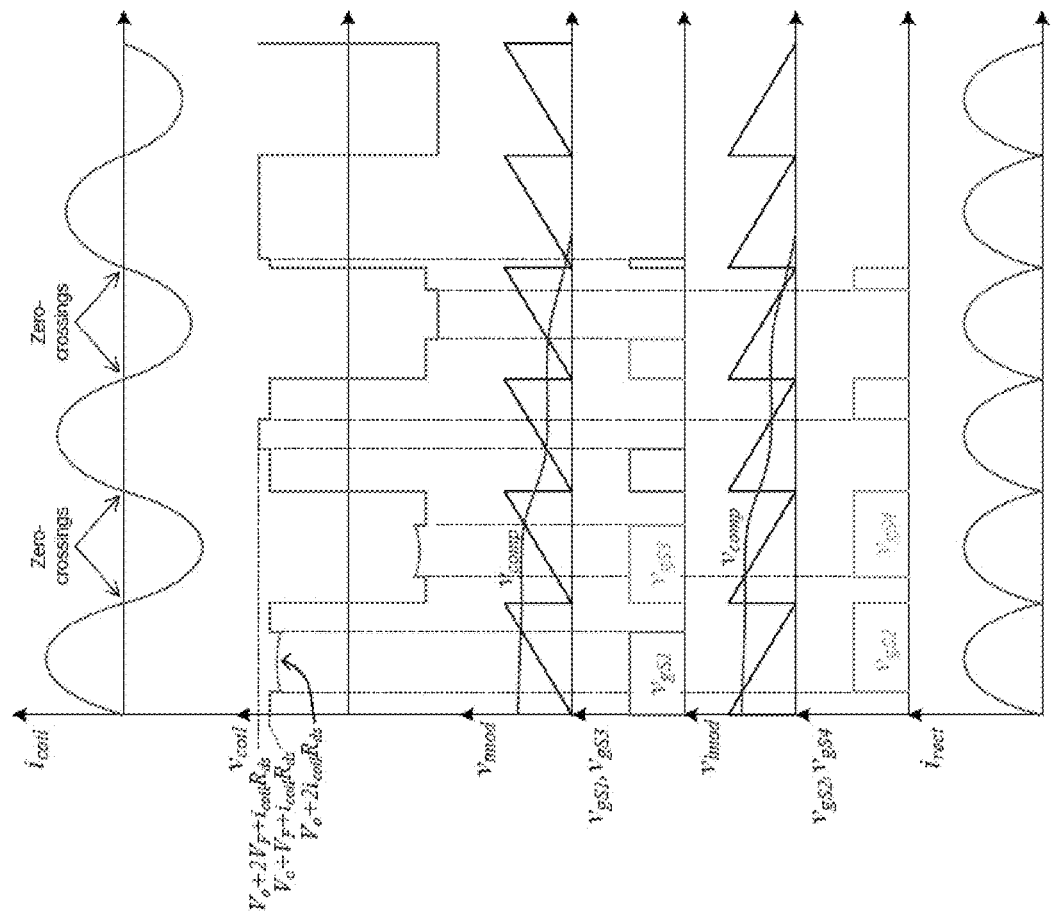
FIG. 5 illustrates various waveforms associated with operating the power receiver of FIG. 4 using alternate-edge modulation to achieve rectification and regulation.

FIG. 5 illustrate various waveforms associated with the operation of the current-type resonant power converter 100 of FIG. 4, where $V_{comp}$ again represents a compensated error signal present in a linear control network. From the coil and rectified current waveforms $i_{coil}$ and $i_{rect}$, it can be seen that adjustment of the duty cycle $D_{SR}$ impacts the transfer characteristics of the resonant tank. Maximum power is transferred when the transistor channels of the full-wave rectifier 118 conduct 100% of the cycle, while the transfer is at a minimum when the rectifier transistors never conduct.

As previously explained herein, the control unit 120 of the power receiver 100 turns off the first rectifier transistor $S_1$ (i.e. $V_{gS1}$=0) if the first transistor $S_1$ is on or turns off the third rectifier transistor $S_3$ (i.e. $V_{gS3}$=0) if the third transistor $S_3$ is on responsive to the trailing-edge PWM signal $V_{tmod}$ rising above the compensated error signal $V_{comp}$. The receiver control unit 120 similarly turns on the second rectifier transistor $S_2$ (i.e. $V_{gS2}$=1) if the second transistor $S_2$ is off or turns on the fourth rectifier transistor $S_4$ (i.e. $V_{gS4}$=1) if the fourth transistor $S_4$ is off, responsive to the leading-edge PWM signal $V_{lmod}$ falling below the error signal $V_{comp}$. The gate voltage levels of the rectifier transistors $V_{gS1}$, $V_{gS2}$, $V_{gS3}$, and $V_{gS4}$ in FIG. 5 correspond to the respective gate signals ("Gate $S_1$,", "Gate $S_2$", etc.) generated by the receiver control unit 120 as shown in FIG. 1. Again, the rectification and regulation behaviour of the full-wave rectifier 118 is identical if the modulation scheme is switched as previously explained herein. In either case and under alternating edge modulation, there are three possible rectifier voltage drops: (1) 2$i_{coil}$Rds; (2) $V_F$+$i_{coil}$Rds; or (3) 2$V_F$ where $V_F$ is the forward voltage of the transistor body diodes. As the load reduces, the body diodes are allowed to conduct a greater portion of the cycle, thus enabling the full-wave rectifier 118 to perform both rectification and regulation in a single current-type resonant power receiver stage.

Figure 6:
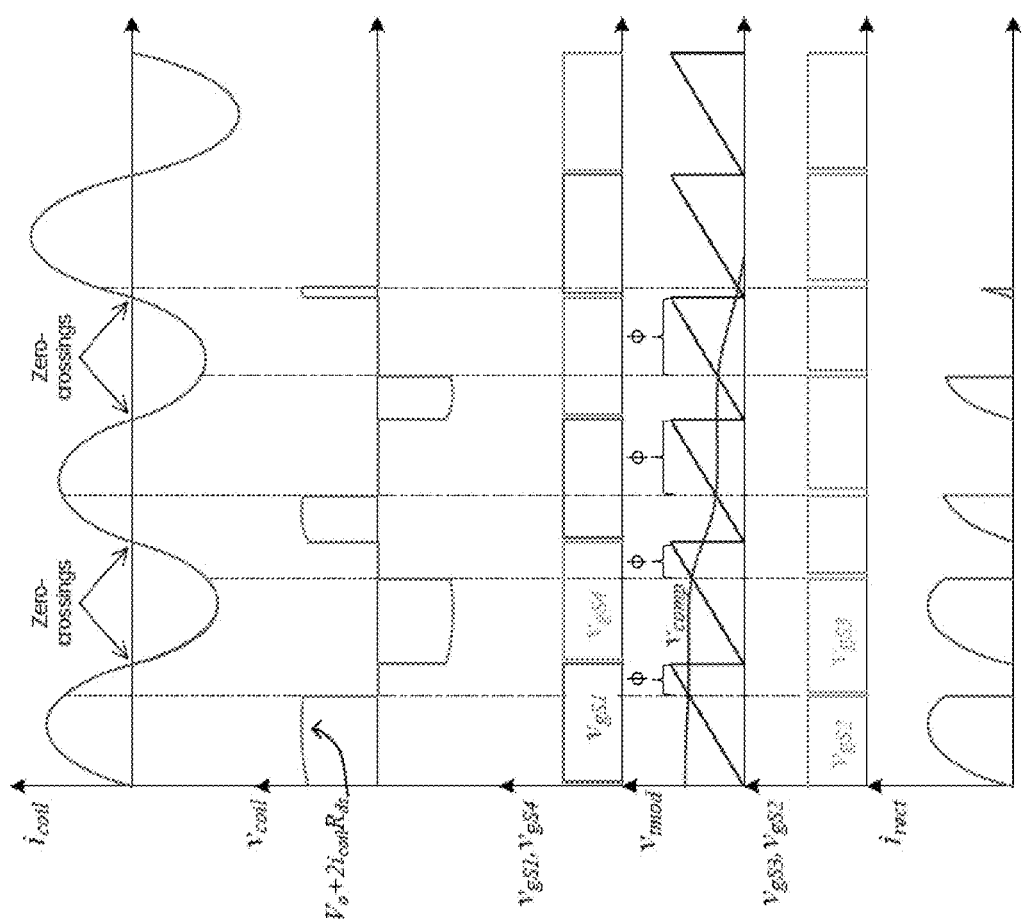
FIG. 6 illustrates various waveforms associated with operating the power receiver of FIG. 4 using phase-shift modulation with trailing-edge modulation to achieve rectification and regulation.

FIG. 6 illustrate various waveforms associated with the operation of the current-type resonant power receiver 100 of FIG. 4, based on a phase-shift modulation (PSM) scheme. According to this embodiment, the control unit 120 of the power receiver 100 switches the transistors of each pair of controllable rectifiers in a complementary fashion with approximately 50% duty cycle. The receiver control unit 120 also introduces a phase shift ($\varphi$) between the pairs of controllable rectifiers. The resulting waveforms shown in FIG. 6 use trailing-edge modulation (standard phase-shift modulation technique) to generate the phase shift.

Figure 7:
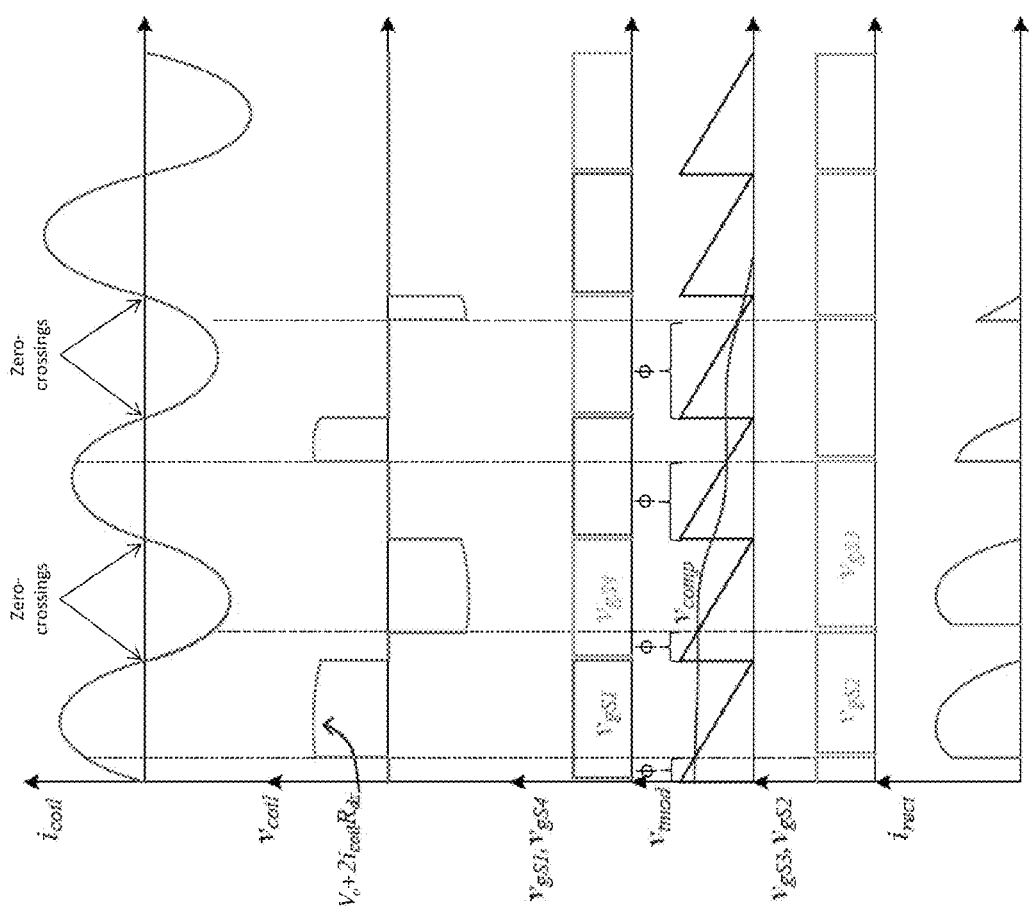
FIG. 7 illustrates various waveforms associated with operating the power receiver of FIG. 4 using phase-shift modulation with leading-edge modulation to achieve rectification and regulation.
Figure 8:
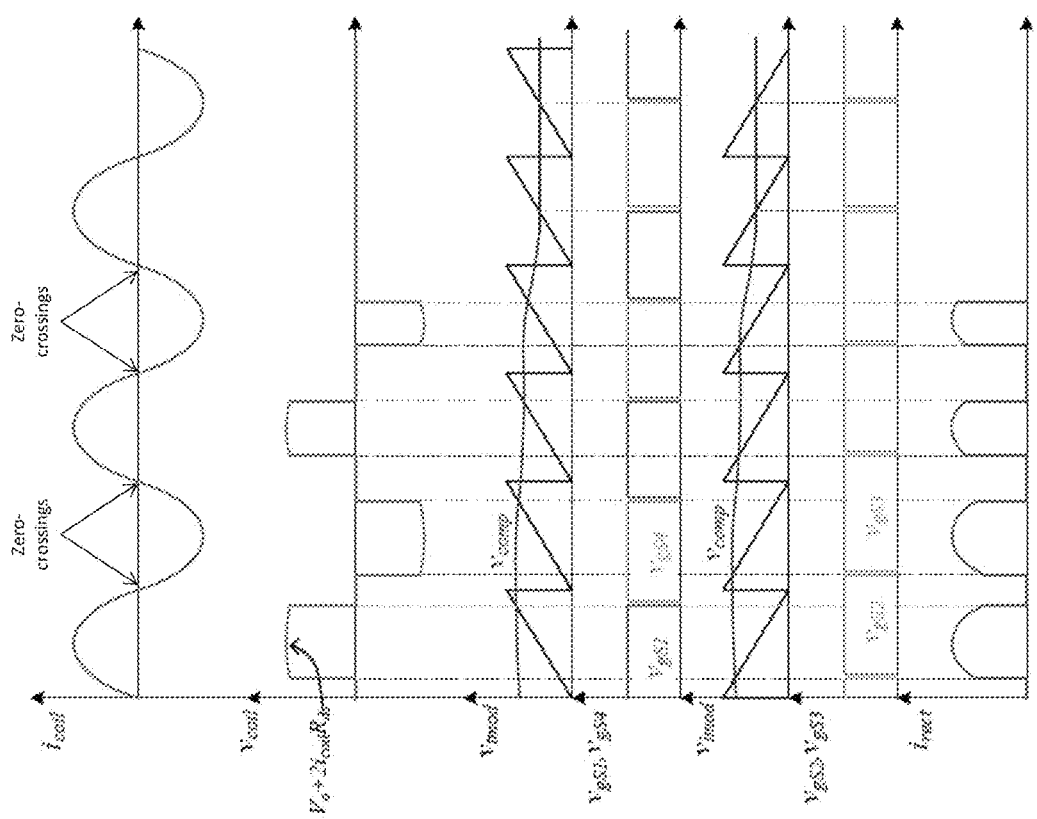
FIG. 8 illustrates various waveforms associated with operating the power receiver of FIG. 4 using phase-shift modulation with alternate-edge modulation to achieve rectification and regulation.

When adjacent rectifier transistors ($S_1$ and $S_3$ or $S_2$ and $S_4$) are switched on by the receiver control unit 120, resonant current circulates instead of being sent to the load 114 and without a large output voltage ripple. With trailing-edge modulation, the rectified current waveform ($i_{rect}$) starts at the zero crossing that begins the half cycle, and then cuts out before the end of the half cycle. If leading-edge modulation is used instead, the rectified current waveform would start sometime after the zero-crossing that starts the half cycle, and then end at the zero-crossing at the end of the half cycle, as illustrated in FIG. 7. The rectified current waveform can be centered at the peak of the rectified coil current ($i_{coil}$) if alternating edge modulation is used to generate the phase shift, as illustrated in FIG. 8. For example, the receiver control unit 120 can use trailing-edge modulation for switching the first and fourth rectifier transistors ($S_1$ and $S_4$) and leading-edge modulation for switching the second and third rectifier transistors ($S_2$ and $S_3$) to introduce the phase shift ($\varphi$) between the pairs of controllable rectifiers. In each case, the current ($i_{rect}$) output by the full-wave rectifier 118 is both rectified and regulated as shown in FIG. 6.

According to the embodiments previously described, PWM-based alternate-edge modulation is used to produce the waveforms in FIGS. 3 and 5, where top transistors $S_1$ and $S_3$ of the full-wave rectifier 118 are controlled with one modulation scheme and the bottom rectifier transistors $S_2$ and $S_4$ are controlled with the opposite scheme. However, the rectifier transistors for a current-type resonant converter can be switched using phase shift modulation (PSM) to achieve single-stage rectification and amplification. As described above for trailing edge modulation and as shown in FIG. 6, rectifier transistors $S_1$ and $S_4$ operate each at 50% duty cycle and are locked in phase to the coil current waveform ($i_{coil}$). Rectifier transistors $S_2$ and $S_3$ are switched complementary with 50% duty cycle in steady state. The phase shift of rectifier transistors $S_2$ and $S_3$ with respect to rectifier transistors $S_1$ and $S_4$ is determined by the compensated error voltage $V_{comp}$. This is standard PSM (phase shift modulation) applied to the transistors of a full-wave rectifier 118 of a resonant converter for providing regulation.

FIG. 7 illustrate various waveforms associated with the operation of the current-type resonant power receiver 100 of FIG. 4, based on a PSM scheme that uses leading-edge modulation instead of trailing-edge modulation to control switching of the rectifier transistors. As can be seen in FIG. 7, the receiver control unit 120 switches the first and fourth rectifier transistors $S_1$, $S_4$ at approximately 50% duty cycle based on a leading-edge PWM signal ($V_{lmod}$) that is locked in phase to the coil current waveform ($i_{coil}$). Rectifier transistors $S_2$ and $S_3$ are switched complementary with 50% duty cycle in steady state and the phase shift ($\varphi$) of transistors $S_2$ and $S_3$ with respect to transistors $S_1$ and $S_4$ is again determined by the compensated error voltage $V_{comp}$ as shown in FIG. 7.

FIG. 8 illustrate various waveforms associated with the operation of the current-type resonant power receiver 100 of FIG. 4, based on a phase-shift modulation scheme that uses alternate-edge modulation to control switching of the rectifier transistors. The alternate-edge modulation provides PSM rectification, but each modulation scheme (leading-edge and trailing-edge) is responsible for the top and bottom transistors ($S_1/S_4$ or $S_2/S_3$) of the full-wave rectifier 118. More specifically, the receiver control unit 120 generates a trailing-edge PWM signal ($V_{tmod}$) that is locked in phase to the coil current waveform ($i_{coil}$) for switching the first and fourth rectifier transistors $S_1$, $S_4$ at approximately 50% duty cycle. The receiver control unit 120 also generates a leading-edge PWM signal ($V_{lmod}$) that is out-of-phase with the coil current waveform ($i_{coil}$) for switching the second and third rectifier transistors $S_2$, $S_3$ also at approximately 50% duty cycle. Similar to the leading-edge and trailing-edge PSM embodiments described above, the phase shift ($\varphi$) of rectifier transistors $S_2$ and $S_3$ with respect to rectifier transistors $S_1$ and $S_4$ is determined by the compensated error voltage $V_{comp}$ as shown in FIG. 8. In one embodiment, $V_{comp}$ is limited e.g. to half the modulation voltage so that charge is not removed from the filter capacitor ($C_f$) and output ripple does not increase.

A key difference between PSM for rectification compared to PWM is current only flows to the filter 122 when opposite switches of the full-wave rectifier 118 are on (e.g. $S_1$ and $S_3$, or $S_2$ and $S_4$). Otherwise, the current circulates. PWM-based switching control exploits the conduction difference of an FET and diode. PSM-based switching control achieves regulation by controlling the amount of current delivered to the load 114, and is applicable only to current-type resonant converters.

Figure 9:
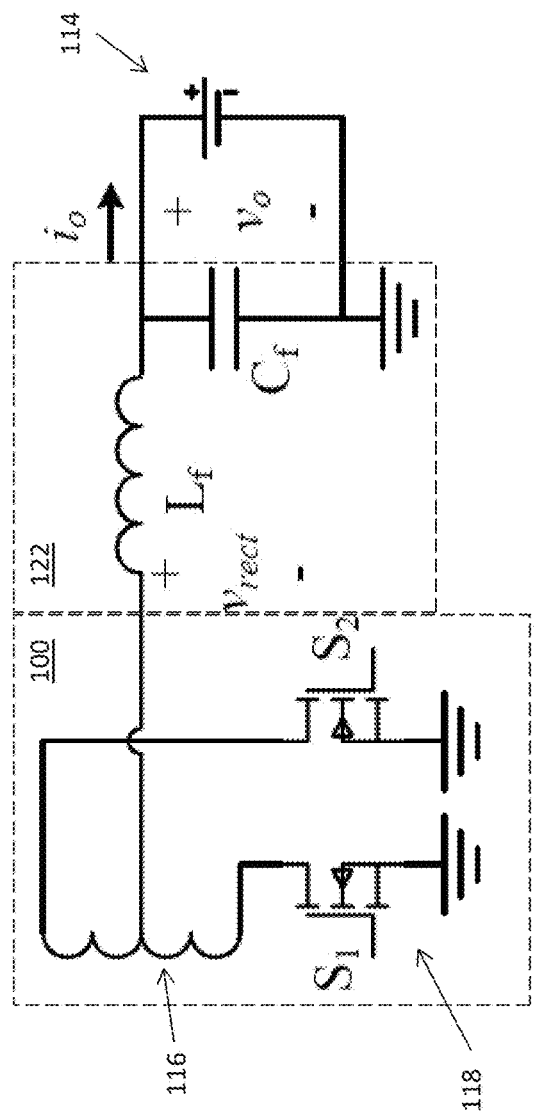
FIG. 9 illustrates a block diagram of another embodiment of the power receiver of FIG. 1 implemented with only one pair of controllable rectifiers and a center tap configuration.

FIG. 9 illustrates another embodiment of the power receiver 100. The embodiment shown in FIG. 9 is similar to the embodiment shown in FIG. 1, however, the full-wave rectifier 118 has only one pair of controllable rectifiers comprising transistors $S_1$ and $S_2$ and a center tap between the first and second terminals of the secondary coil 116. Transistors $S_1$ and $S_2$ rectify the voltage or current signal ($V_{coil}$ or $i_{coil}$) for each respective half cycle based on the compensated error voltage $V_{comp}$. When the rectifier transistors are switched on, an IR drop is experienced across the devices, making the rectified voltage Vrect=$|V_{coil}|$−IoRds where IoRds is the IR drop for an FET. When the rectifier transistors are switched off, the rectified voltage is Vrect=$|V_{coil}|$−$V_F$ where $V_F$ is the forward voltage of the transistor body diodes. The technique can be applied to current-type topologies and the corresponding waveforms would then resemble FIG. 5 where the coil voltage is distorted by a single IR or $V_F$ voltage.

Figure 10:
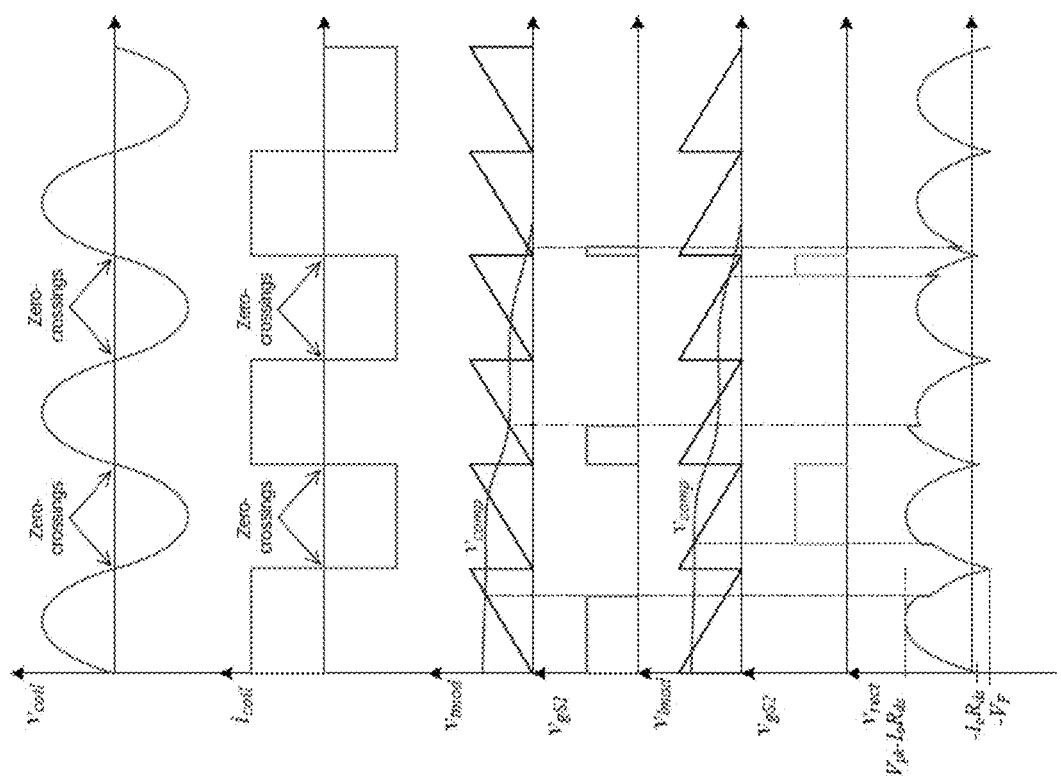
FIG. 10 illustrates various waveforms associated with operating the power receiver of FIG. 9 using alternate-edge modulation to achieve rectification and regulation.

FIG. 10 illustrate various waveforms associated with the operation of the power receiver 100 of FIG. 9. During operation, the receiver control unit 120 (not shown in FIG. 9) switches the first rectifier transistor $S_1$ based on a trailing-edge PWM signal $V_{tmod}$ synced to the resonant current or voltage waveform ($i_{coil}$ or $V_{coil}$) for the secondary coil 116 and switches the second rectifier transistor $S_2$ based on a leading-edge PWM signal $V_{lmod}$ also synced to the resonant waveform. The trailing-edge and leading-edge PWM signals each go to (approach) zero at zero-crossing points of the resonant waveform as previously described herein. The receiver control unit 120 turns off the first rectifier transistor $S_1$ if the first transistor $S_1$ is on responsive to the trailing-edge PWM signal $V_{tmod}$ rising above the compensated error voltage $V_{comp}$. The receiver control unit 120 turns on the second rectifier transistor $S_2$ if the first and second transistors $S_1$ and $S_2$ are both off responsive to the leading-edge PWM signal $V_{lmod}$ falling below the error signal $V_{comp}$.

In both the voltage-type and current-type resonant converter embodiments previously described herein, the power receiver 100 measures, detects, estimates, or otherwise identifies the zero-crossing points in the resonant waveform ($V_{coil}$ for voltage-type resonant network and $i_{coil}$ for current-type) in order to implement the single-stage rectification and regulation modulation schemes previously described herein. Voltage sense circuits for sensing $V_{coil}$ are straightforward and well known and thus no further explanation is given in this regard in connection with the voltage-type resonant converter embodiments. Zero-crossing detection for current-type resonant converters tends to be more involved, several embodiments of which are described in more detail next in connection with FIGS. 11-13.

Figure 11:
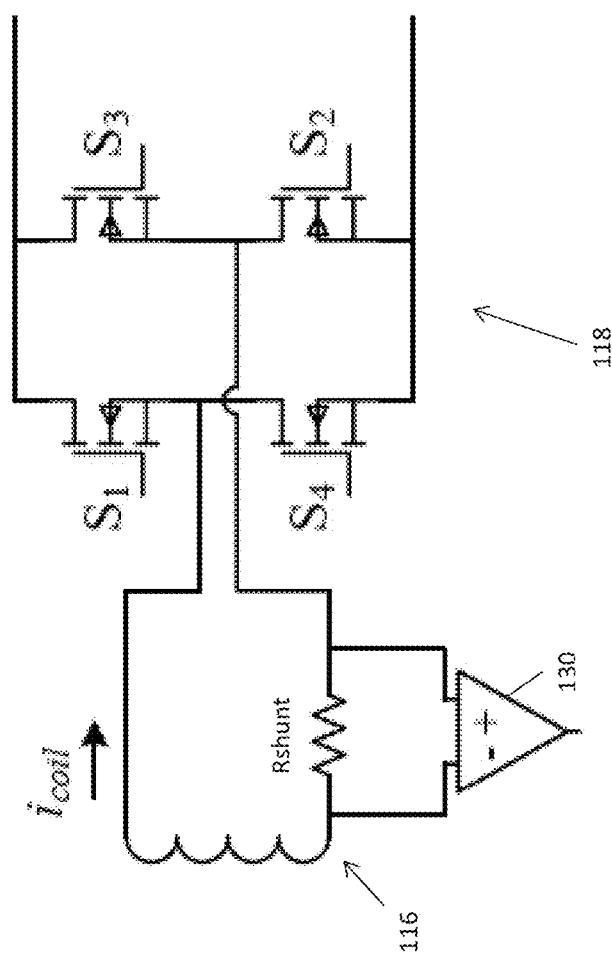
FIG. 11 illustrates a block diagram of an embodiment of a zero-crossing detection circuit for use with a current-type resonant converter of a wireless power receiver having a single rectification and regulation stage.

FIG. 11 illustrates one embodiment of a zero-crossing detection circuit for use with the current-type resonant converters described herein. According to this embodiment, a shunt resistor ($R_{shunt}$) is placed in the current path and the voltage across the shunt resistor is measured by a comparator 130 to determine zero-crossings in $i_{coil}$.

Figure 12:
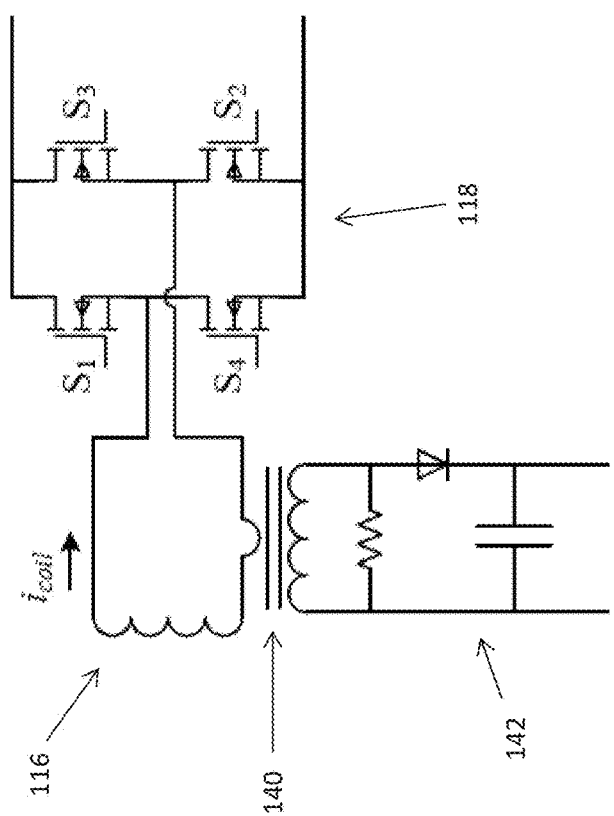
FIG. 12 illustrates a block diagram of another embodiment of a zero-crossing detection circuit for use with a current-type resonant converter of a wireless power receiver having a single rectification and regulation stage.

FIG. 12 illustrates another embodiment of a zero-crossing detection circuit for use with the current-type resonant converters described herein. According to this embodiment, a current transformer (or multiple current transformers) 140 is placed in the current path for determining zero-crossings in $i_{coil}$ using a sense network 142. More than one current transformer can be used because each transformer only works for one half cycle. As such, two current transformers are needed to generate a complete sine wave. Alternatively, one current transformer can be used to measure a half-cycle and then the second half-cycle can be predicated or calculated.

Figure 13:
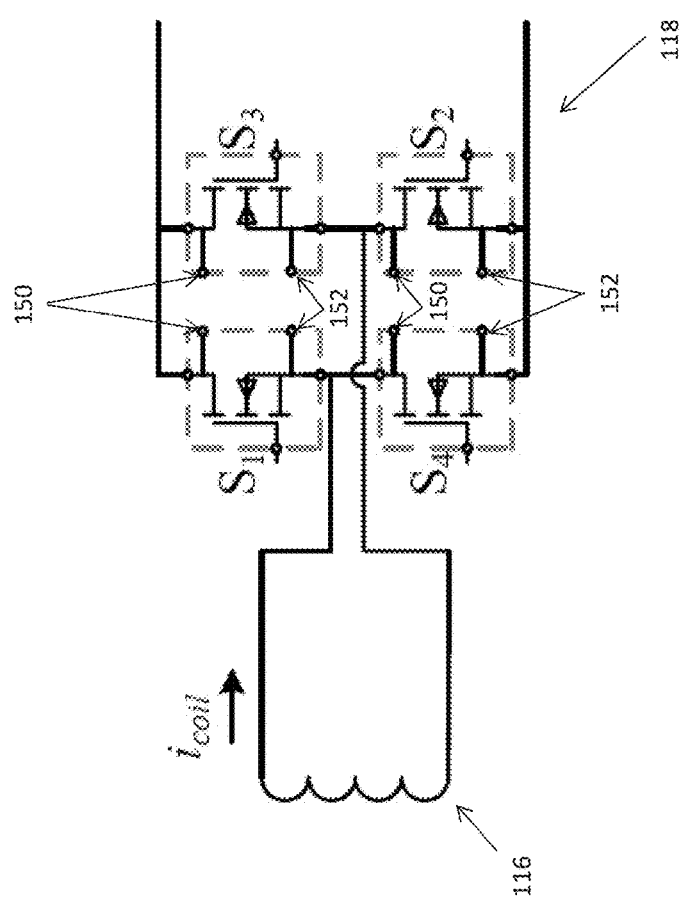
FIG. 13 illustrates a block diagram of yet another embodiment of a zero-crossing detection circuit for use with a current-type resonant converter of a wireless power receiver having a single rectification and regulation stage.

FIG. 13 illustrates yet another embodiment of a zero-crossing detection circuit for use with the current-type resonant converters described herein. According to this embodiment, two or more of the rectifier transistors $S_1$, $S_2$, $S_3$, $S_4$ have two extra terminals 150, 152 that output a signal related to the current through the respective rectifier transistors. For example, the two extra terminals 150, 152 can be for current mirrors, current-controlled voltage sources or voltage-controlled voltage sources. Minimally one rectifier transistor in each pair of controllable rectifiers should be able to supply the current information for a complete resonant cycle. However, like the current transformer embodiment of FIG. 12, if only one rectifier transistor can provide this information, then only half a cycle is known and the second half cycle can be predicted/calculated.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A rectification and regulation circuit for a wireless power receiver, the rectification and regulation circuit comprising:
    a coil for magnetically coupling to a primary coil of a power transmitter;
    a full-wave rectifier separate from the power transmitter and having a first pair of controllable rectifiers comprising a first transistor connected to a first terminal of the coil and a second transistor connected to a second terminal of the coil; and
    a control unit separate from the power transmitter and operable to control switching of the transistors of the full-wave rectifier so that the full-wave rectifier (a) generates a rectified output for charging a battery of the wireless power receiver by rectifying current through the coil or voltage across the coil and (b) regulates the rectified output.

2. The rectification and regulation circuit of claim 1, wherein the full-wave rectifier has a second pair of controllable rectifiers comprising a third transistor connected to the second terminal of the coil and a fourth transistor connected to the first terminal of the coil.

3. The rectification and regulation circuit of claim 2, wherein the control unit is operable to control switching of the first and third transistors based on a trailing-edge PWM (pulse width modulation) signal synced to a resonant current or voltage waveform for the coil and control switching of the second and fourth transistors based on a leading edge PWM signal synced to the resonant waveform, the trailing-edge PWM signal and the leading-edge PWM signal each going to zero at zero-crossing points of the resonant waveform.

4. The rectification and regulation circuit of claim 3, wherein the control unit is operable to turn off the first transistor if the first transistor is on or turn off the third transistor if the third transistor is on responsive to the trailing-edge PWM signal rising above an error signal, and wherein the control unit is operable to turn on the second transistor if the second transistor is off or turn on the fourth transistor if the fourth transistor is off responsive to the leading-edge PWM signal falling below the error signal.

5. The rectification and regulation circuit of claim 2, wherein the control unit is operable to control switching of the transistors of each pair of controllable rectifiers in a complimentary manner with 50% duty cycle to rectify the current through the coil or the voltage across the coil, and wherein the control unit is operable to introduce a phase shift between the pairs of controllable rectifiers to regulate the rectified output.

6. The rectification and regulation circuit of claim 5, wherein the control unit is operable to use trailing-edge modulation or leading-edge modulation for further controlling switching of the second and third transistors to introduce the phase shift between the pairs of controllable rectifiers.

7. The rectification and regulation circuit of claim 5, wherein the control unit is operable to use trailing-edge modulation for further controlling switching of the first and fourth transistors and leading-edge modulation for further controlling switching of the second and third transistors to introduce the phase shift between the pairs of controllable rectifiers.

8. The rectification and regulation circuit of claim 1, wherein the full-wave rectifier has only the first pair of controllable rectifiers and a center tap between the first and second terminals of the coil.

9. The rectification and regulation circuit of claim 8, wherein the control unit is operable to control switching of the first transistor based on a trailing-edge PWM (pulse width modulation) signal synced to a resonant current or voltage waveform for the coil and control switching of the second transistor based on a leading-edge PWM signal synced to the resonant waveform, the trailing-edge PWM signal and the leading-edge PWM signal each going to zero at zero-crossing points of the resonant waveform.

10. The rectification and regulation circuit of claim 9, wherein the control unit is operable to turn off the first transistor if the first transistor is on responsive to the trailing-edge PWM signal rising above error signal, and wherein the control unit is operable to turn on the second transistor if the first and second transistors are off responsive to the leading-edge PWM signal falling below the error signal.

11. The rectification and regulation circuit of claim 1, wherein the control unit is further operable to regulate the rectified output by regulating a voltage of the regulated output, the voltage regulating being based upon an error voltage.

* * * * *